(12) United States Patent
Iwama et al.

(10) Patent No.: US 10,979,146 B2
(45) Date of Patent: Apr. 13, 2021

(54) OPTICAL TRANSMISSION DEVICE, OPTICAL TRANSMISSION SYSTEM, AND OPTICAL TRANSMISSION METHOD

(71) Applicant: FUJITSU OPTICAL COMPONENTS LIMITED, Kawasaki (JP)

(72) Inventors: Yamato Iwama, Kawasaki (JP); Mai Luan Nguyen, Kawasaki (JP); Masato Nishihara, Kawasaki (JP); Toshiki Tanaka, Setagaya (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/667,337

(22) Filed: Oct. 29, 2019

(65) Prior Publication Data

US 2020/0177281 A1 Jun. 4, 2020

(30) Foreign Application Priority Data

Nov. 30, 2018 (JP) .............................. JP2018-225498

(51) Int. Cl.
*H04B 10/516* (2013.01)
*H04B 10/66* (2013.01)

(52) U.S. Cl.
CPC ........... *H04B 10/516* (2013.01); *H04B 10/66* (2013.01)

(58) Field of Classification Search
CPC ......................................... H04B 10/516–5563
See application file for complete search history.

(56) References Cited

U.S. PATENT DOCUMENTS

| 6,885,697 | B1 * | 4/2005 | Tokunaga ............... H04L 5/023 370/329 |
| 2004/0131365 | A1 | 7/2004 | Lee et al. |
| 2014/0099111 | A1 * | 4/2014 | Nishihara ........... H04J 14/0282 398/66 |
| 2016/0127091 | A1 * | 5/2016 | Yan ..................... H04L 27/2626 370/329 |
| 2016/0218812 | A1 * | 7/2016 | Okabe ................ H04B 10/0775 |
| 2016/0226613 | A1 * | 8/2016 | Chen .................... H04W 52/346 |
| 2016/0285548 | A1 * | 9/2016 | Nishihara ............... H04B 10/61 |
| 2017/0093515 | A1 * | 3/2017 | Tanaka .................. H04B 10/564 |
| 2017/0230120 | A1 * | 8/2017 | Okabe ................ H04B 10/6165 |
| 2018/0041281 | A1 * | 2/2018 | Koiwai .................. H04B 10/50 |
| 2018/0294888 | A1 * | 10/2018 | Iwata ............... H04B 10/50575 |
| 2018/0337735 | A1 * | 11/2018 | Takahara ............. H04L 5/0053 |

FOREIGN PATENT DOCUMENTS

| JP | 6303196 | 10/1994 |
| JP | 2004215277 | 7/2004 |
| WO | WO2015087448 | 6/2015 |

* cited by examiner

*Primary Examiner* — Nathan M Cors
(74) *Attorney, Agent, or Firm* — Staas & Halsey LLP

(57) ABSTRACT

An optical transmission device includes a light source that is driven according to a multicarrier modulation signal in which data is allocated to a plurality of subcarriers to transmit an optical multicarrier modulation signal to another optical transmission device, and a control unit that controls a driving condition of the light source, based on the number of bits allocatable to each of the subcarriers of the multicarrier modulation signal, the number of bits being determined according to transmission characteristics of the optical multicarrier modulation signal in the other optical transmission device.

4 Claims, 12 Drawing Sheets

OPTICAL TRANSMISSION DEVICE, OPTICAL TRANSMISSION SYSTEM, AND OPTICAL TRANSMISSION METHOD

CROSS-REFERENCE TO RELATED APPLICATION

This application is based upon and claims the benefit of priority of the prior Japanese Patent Application No. 2018-225498, filed on Nov. 30, 2018, the entire contents of which are incorporated herein by reference.

FIELD

The embodiments discussed herein are related to an optical transmission device, an optical transmission system, and an optical transmission method.

BACKGROUND

As a transmission scheme capable of transmitting large capacity data, for example, application of a multicarrier modulation scheme such as a discrete multi-tone (DMT) modulation scheme to an optical transmission system has been studied. The DMT modulation scheme is a scheme in which data is allocated to a plurality of subcarriers (SCs) having different frequencies and the data allocated to each SC is subjected to multilevel modulation. In the DMT modulation scheme, the number of bits that can be allocated to each SC can be changed according to transmission characteristics such as a signal-to-noise ratio (SNR). That is, in a reception-side optical transmission device, the number of bits that can be allocated to each SC is determined according to the transmission characteristics such as an SNR, is multiplexed into an optical signal, and is fed back to a transmission-side optical transmission device. Then, in the transmission-side optical transmission device, data is allocated to each SC on the basis of the number of bits (a multilevel degree) that has been extracted from an electrical signal obtained by electrically converting the optical signal and can be allocated to each SC. In this way, in the DMT modulation scheme, it is possible to improve frequency utilization efficiency of a transmission band and increase a transmission capacity.

Meanwhile, when the DMT modulation scheme is employed, since device characteristics may vary due to a change or the like in environmental temperature to be used, transmission characteristics may deteriorate. For example, when the environmental temperature increases, light output power of a light source in the transmission-side optical transmission device decreases. When the optical output power of the light source decreases, transmission characteristics deteriorate.

On the other hand, in order to suppress a decrease in the optical output power of the light source, optimization of the driving condition (for example, the amount or amplitude of a bias current supplied to the light source) of the light source has been studied. For example, there is a technology in which the transmission-side optical transmission device controls the driving conditions of the light source on the basis of the SNR of each SC measured by the reception-side optical transmission device. International Publication Pamphlet No. WO 2015/087448 is an example of related art.

However, when the transmission-side optical transmission device controls the driving conditions of the light source on the basis of the SNR of each SC, a signal path for feeding back the SNR of each SC is provided between the transmission-side optical transmission device and the reception-side optical transmission device separately from an optical transmission path for transmitting an optical signal. When the signal path for feeding back the SNR of each SC is provided between the transmission-side optical transmission device and the reception-side optical transmission device, a device configuration in an entire optical transmission system becomes complicated. In this regard, it is expected to optimize the driving condition of the light source with a simple configuration.

SUMMARY

According to an aspect of an embodiment, an optical transmission device includes a light source that is driven according to a multicarrier modulation signal in which data is allocated to a plurality of subcarriers to transmit an optical multicarrier modulation signal to another optical transmission device; and a control unit that controls a driving condition of the light source, based on number of bits allocatable to each of the subcarriers of the multicarrier modulation signal, the number of bits being determined according to transmission characteristics of the optical multicarrier modulation signal in the other optical transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
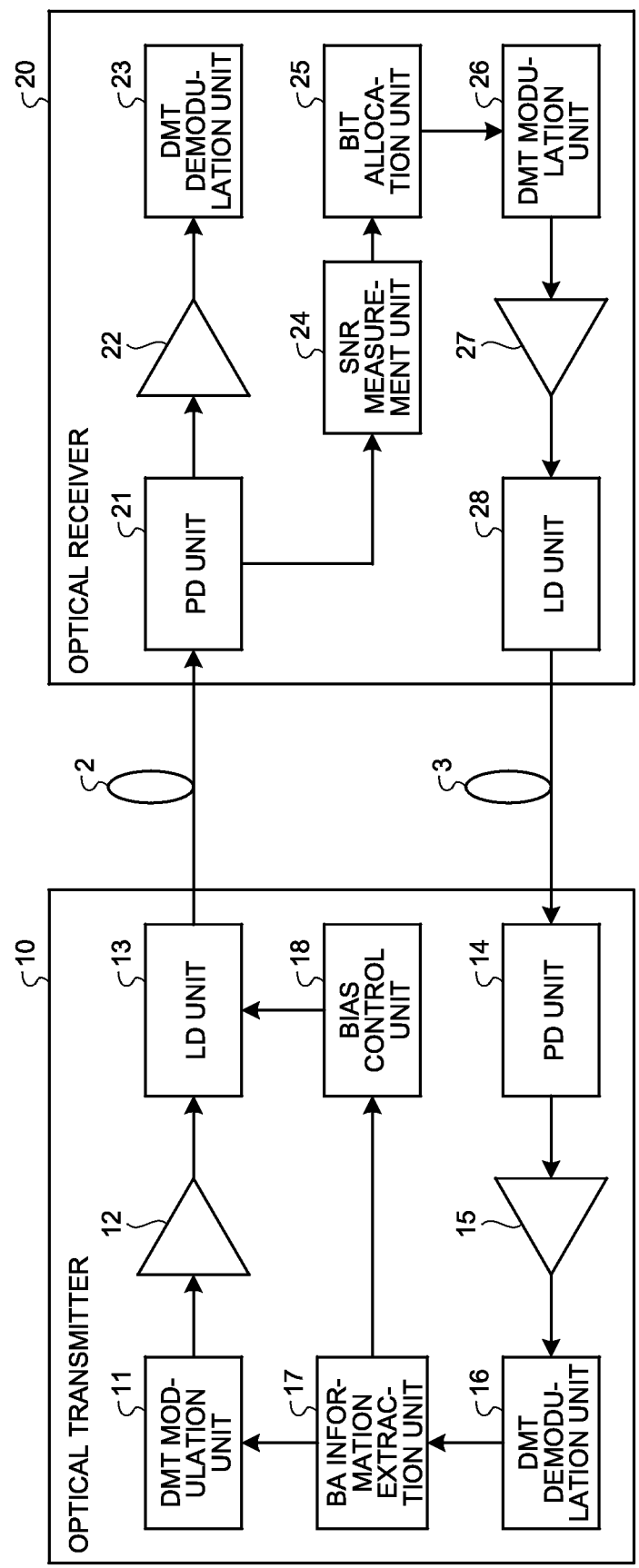
FIG. 1 is a diagram illustrating a configuration example of an optical transmission system of a first embodiment.

Preferred embodiments of the present invention will be explained with reference to accompanying drawings.

The disclosed technology is not limited to the embodiments. Furthermore, in the embodiments, configurations having equivalent functions are denoted by the same reference numerals and a redundant description thereof will be omitted.

[a] First Embodiment

FIG. 1 is a diagram illustrating a configuration example of an optical transmission system 1 of a first embodiment. The optical transmission system 1 illustrated in FIG. 1 includes an optical transmitter 10 and an optical receiver 20. The optical transmitter 10 and the optical receiver 20 are connected to each other via optical transmission paths 2 and 3. The optical transmitter 10 is an example of a first optical transmission device and the optical receiver 20 is an example of a second optical transmission device.

The optical transmitter 10 includes a DMT modulation unit 11, an amplifier unit 12, a laser diode (LD) unit 13, a photo detector (PD) unit 14, an amplifier unit 15, a DMT demodulation unit 16, a bit allocation (BA) information extraction unit 17, and a bias control unit 18.

The DMT modulation unit 11 allocates data to a plurality of SCs having different frequencies and multilevel-modulates the data allocated to each SC, thereby generating a DMT modulation signal in which the data has been allocated to the SCs. The amplifier unit 12 amplifies the DMT modulation signal.

The LD unit 13 is driven according to the DMT modulation signal, optically converts the amplified DMT modulation signal into an optical DMT modulation signal, and transmits the optical DMT modulation signal subjected to the optical conversion to the optical receiver 20 via the optical transmission path 2. The LD characteristics of the LD unit 13, for example, are expressed by a relation between a bias current and optical output power, or the like, and vary depending on environmental temperature at which the LD unit 13 is used. For example, when the bias current is constant, it is known that the optical output power of the optical DMT modulation signal output from the LD unit 13 decreases as the environmental temperature increases. The LD unit 13 is an example of a light source.

The PD unit 14 electrically converts an optical DMT modulation signal received from the optical receiver 20 via the optical transmission path 3 into a DMT demodulation signal. The optical DMT modulation signal received from the optical receiver 20 includes multiplexed BA information. The BA information is information indicating the number of bits that can be allocated to each SC of the DMT modulation signal generated by the DMT modulation unit 11, and is generated by the optical receiver 20. The amplifier unit 15 amplifies the DMT modulation signal subjected to the electrical conversion. The DMT demodulation unit 16 acquires reception data by demodulating the amplified DMT modulation signal. The BA information extraction unit 17 extracts the BA information from the amplified DMT modulation signal, and determines a multilevel degree for each SC, which is used for the DMT modulation (multilevel modulation) in the DMT modulation unit 11, on the basis of the number of bits of each SC indicated by the BA information.

The bias control unit 18 adjusts an amount of the bias current, which is a driving current supplied to the LD unit 13, by using the BA information extracted from the DMT modulation signal. The amount of the bias current is an example of a driving condition of the LD unit 13.

Furthermore, the optical receiver 20 includes a PD unit 21, an amplifier unit 22, a DMT demodulation unit 23, an SNR measurement unit 24, a bit allocation unit 25, a DMT modulation unit 26, an amplifier unit 27, and an LD unit 28.

The PD unit 21 electrically converts the optical DMT modulation signal received from the optical transmitter 10 via the optical transmission path 2 into a DMT modulation signal. The amplifier unit 27 amplifies the DMT modulation signal subjected to the electrical conversion. The DMT demodulation unit 23 acquires reception data by demodulating the amplified DMT modulation signal.

The SNR measurement unit 24 measures an SNR which is an example of the transmission characteristics of the optical DMT modulation signal received from the optical transmitter 10.

The bit allocation unit 25 determines the number of bits, which can be allocated to each SC of the DMT modulation signal generated by the DMT modulation unit 11 of the optical transmitter 10, according to the measured SNR of the optical DMT modulation signal. For the determination on the number of bits that can be allocated to each SC of the DMT modulation signal, for example, a water-filling principle is used. Specifically, the bit allocation unit 25 allocates more bits to an SC with a high SNR than an SC with a low SNR. Then, the bit allocation unit 25 generates the BA information indicating the number of bits that can be allocated to each SC of the DMT modulation signal generated by the DMT modulation unit 11. That is, the SNR of the optical DMT modulation signal is converted into the BA information by the bit allocation unit 25. The amount of information of the converted BA information is reduced compared to the SNR of the optical DMT modulation signal.

The DMT modulation unit 26 allocates data and the generated BA information to a plurality of SCs having different frequencies and multilevel-modulates the data and the BA information allocated to each SC, thereby generating a DMT modulation signal in which the data and the BA information have been multiplexed. The amplifier unit 27 amplifies the DMT modulation signal.

The LD unit 28 is driven according to the DMT modulation signal, optically converts the amplified DMT modulation signal into an optical DMT modulation signal, and transmits the optical DMT modulation signal subjected to the optical conversion to the optical transmitter 10 via the optical transmission path 3. Since the DMT modulation signal includes the multiplexed BA information, the optical DMT modulation signal also includes the multiplexed BA information. That is, the optical DMT modulation signal is transmitted to the optical transmitter 10, so that the BA information multiplexed in the optical DMT modulation signal is also transmitted to the optical transmitter 10. The LD unit 28 is an example of a transmission unit.

Furthermore, the bias control unit 18 of the optical transmitter 10 acquires the BA information extracted from the DMT modulation signal by the BA information extraction unit 17, and controls the bias current of the LD unit 13 on the basis of the number of bits that can be allocated to each SC and is indicated by the BA information. Specifically, on the basis of the number of bits that can be allocated to each SC, the bias control unit 18 monitors an identification number (hereinafter, referred to as "maximum SC number") of a maximum SC in which the number of bits is not 0 among the SCs. Then, the bias control unit 18 adjusts the amount of the bias current of the LD unit 13 so that the maximum SC number approaches a target value. For example, when the maximum SC number is smaller than the target value, the bias control unit 18 increases the amount of the bias current of the LD unit 13. As the amount of the bias current of the LD unit 13 increases, the optical output power of the optical DMT modulation signal output from the LD unit 13 also increases. As a consequence, the SNR measured by the SNR measurement unit 24 of the optical receiver 20 is improved, so that the maximum SC number in the BA information generated by the bit allocation unit 25 of the optical receiver 20 approaches the target value.

Meanwhile, in the optical transmitter 10 employing the DMT modulation scheme, when the bias current is constant, the optical output power of the optical DMT modulation signal from the LD unit 13 decreases as the environmental temperature increases. When the optical output power of the optical DMT modulation signal from the LD unit 13 decreases, the transmission characteristics such as the SNR deteriorate. In this regard, in order to suppress a decrease in the optical output power of the optical DMT modulation signal from the LD unit 13, it is conceivable that the optical transmitter 10 controls the driving condition of the LD unit 13 on the basis of the SNR measured by the SNR measurement unit 24 of the optical receiver 20. In such a case, a signal path for feeding back the SNR is provided between the optical transmitter 10 and the optical receiver 20 separately from the optical transmission paths 2 and 3 for transmitting the optical DMT modulation signal. When the signal path for feeding back the SNR is provided between the optical transmitter 10 and the optical receiver 20, the device configuration of the entire optical transmission system 1 becomes complicated.

In this regard, in the optical transmitter 10 of the first embodiment, the bias control unit 18 controls the driving condition (that is, the bias current) of the LD unit 13 on the basis of the number of bits indicated by the BA information multiplexed in the optical DMT modulation signal transmitted from the optical receiver 20 to the optical transmitter 10. That is, the bias control unit 18 applies BA information originally used for determining the multilevel degree of the DMT modulation in the DMT modulation unit 11 to the control of the driving condition (that is, the bias current) of the LD unit 13.

In this way, in the optical transmission system 1, it is possible to optimize the driving condition of the LD unit 13 with a simple configuration without providing the signal path for feeding back the SNR between the optical transmitter 10 and the optical receiver 20.

Figure 2:
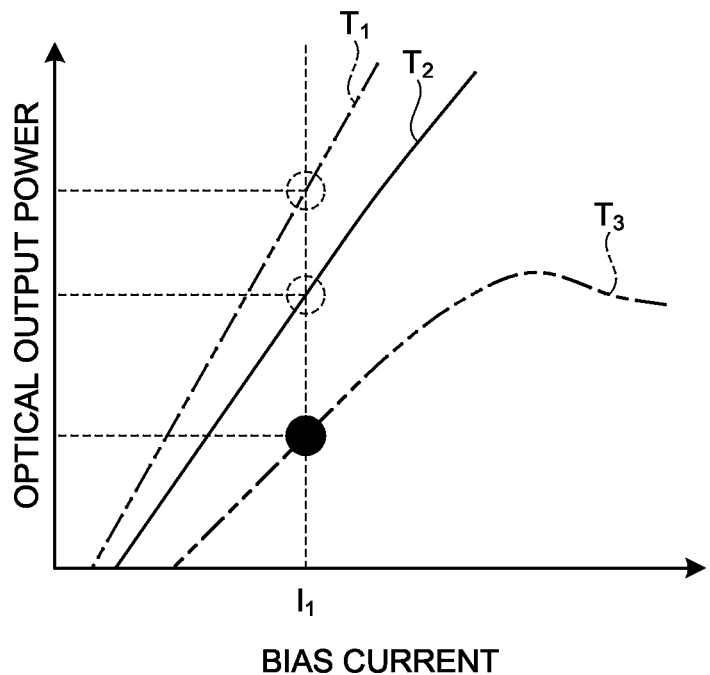
FIG. 2 is a diagram for explaining an example of a flow of adjusting the amount of a bias current of an LD unit in the first embodiment.
Figure 3:
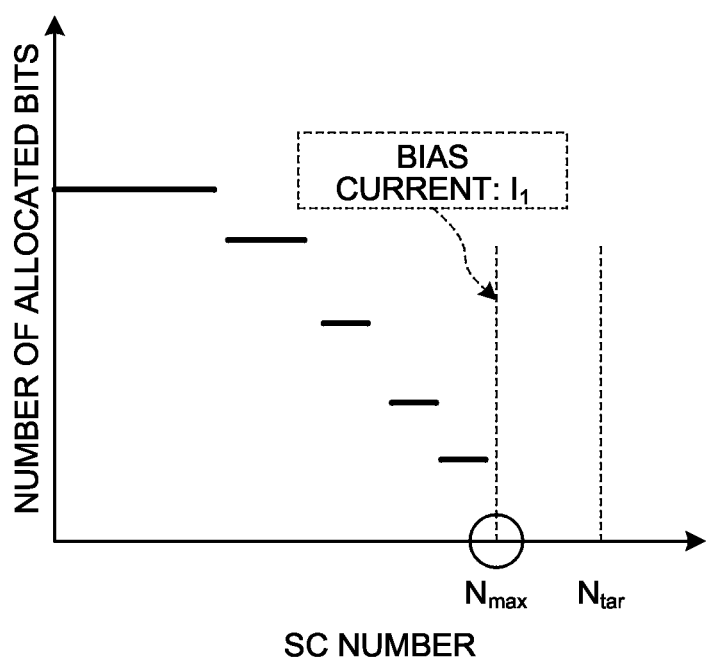
FIG. 3 is a diagram for explaining an example of a flow of adjusting the amount of the bias current of the LD unit in the first embodiment.
Figure 4:
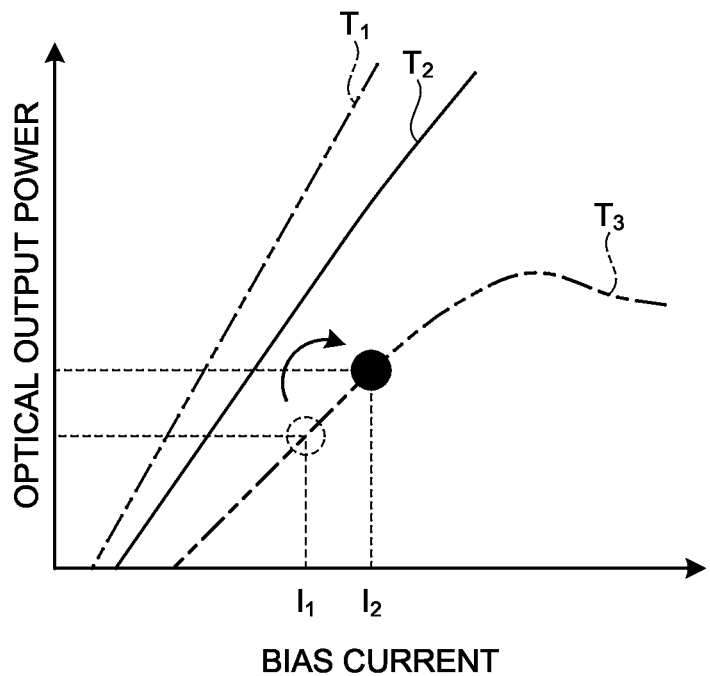
FIG. 4 is a diagram for explaining an example of a flow of adjusting the amount of the bias current of the LD unit in the first embodiment.
Figure 5:
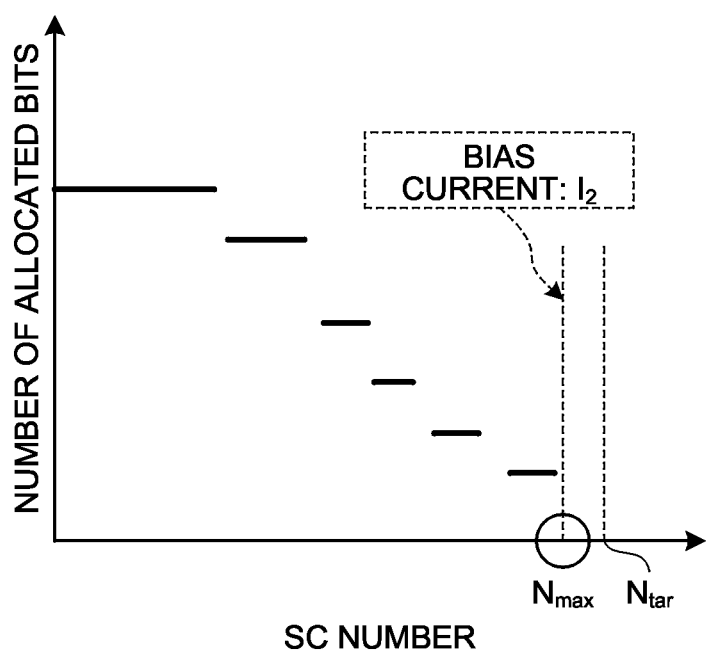
FIG. 5 is a diagram for explaining an example of a flow of adjusting the amount of the bias current of the LD unit in the first embodiment.

FIG. 2 to FIG. 5 are diagrams for explaining an example of a flow of adjusting the amount of the bias current of the LD unit 13 in the first embodiment. In FIG. 2, graphs $T_1$ to $T_3$ indicate characteristics of the bias current versus the optical output power when the environmental temperature is $T_1$ to $T_3$ ($T_1<T_2<T_3$), respectively. Furthermore, FIG. 2 illustrates a state in which the bias current of the LD unit 13 is set to $I_1$. When the bias current is maintained at $I_1$, the optical output power of the optical DMT modulation signal from the LD unit 13 decreases as the environmental temperature increases as $T_1 \rightarrow T_2 \rightarrow T_3$. The optical output power of the optical DMT modulation signal from the LD unit 13 decreases, resulting in a variation of the number of bits that can be allocated to each SC and is indicated by the BA information. FIG. 3 illustrates the BA information in which the number of bits that can be allocated to each SC varies. In the example of FIG. 3, as the optical output power of the optical DMT modulation signal from the LD unit 13 decreases, a maximum SC number $N_{max}$ is smaller than a target value $N_{tar}$. The bias control unit 18 of the optical transmitter 10 monitors the BA information illustrated in FIG. 3, determines that the maximum SC number $N_{max}$ is smaller than the target value $N_{tar}$, and increases the amount of the bias current of the LD unit 13. When the maximum SC number $N_{max}$ is smaller than the target value $N_{tar}$, it can be estimated that the SNR of the optical DMT modulation signal output from the LD unit 13 is degraded. FIG. 4 illustrates a state in which the bias current of the LD unit 13 is increased from $I_1$ to $I_2$ ($>I_1$). As the bias current of the LD unit 13 is increased from $I_1$ to $I_2$, the optical output power of the optical DMT modulation signal from the LD unit 13 also increases. When the optical output power of the optical DMT modulation signal from the LD unit 13 increases, the SNR of the optical DMT modulation signal is improved, resulting in a variation of the number of bits that can be allocated to each SC and is indicated by the BA information varies. FIG. 5 illustrates the BA information in which the number of bits that can be allocated to each SC varies. In the example of FIG. 5, as the optical output power of the optical DMT modulation signal from the LD unit 13 increases, the maximum SC number $N_{max}$ approaches the target value $N_{tar}$. In this way, the total number of SCs, to which the number of bits is allocated, increases, resulting in the improvement of the transmission characteristics, such as reception sensitivity and transmission capacity, of the optical DMT modulation signal output from the LD unit 13.

Figure 6:
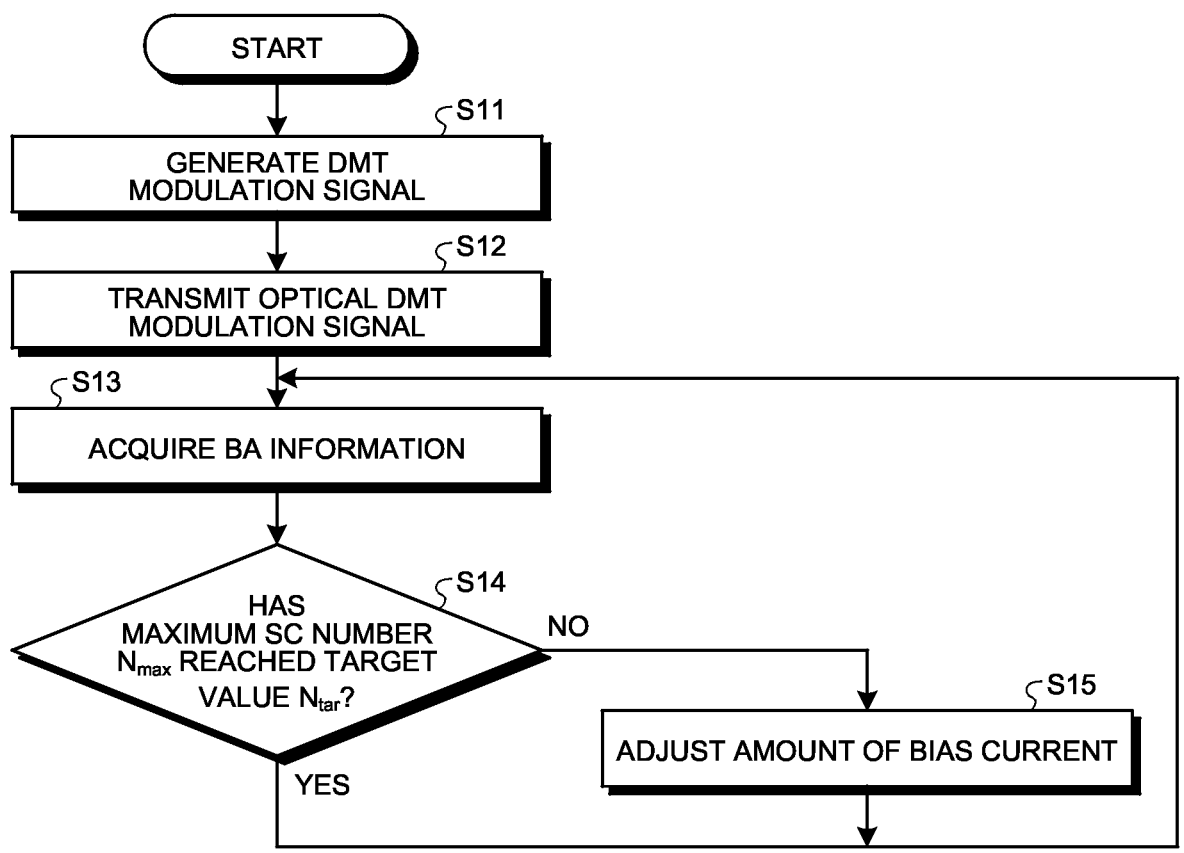
FIG. 6 is a flowchart illustrating an example of a processing operation of an optical transmitter related to a driving condition control process of the LD unit of the first embodiment.

Next, a processing operation of the optical transmitter 10 of the first embodiment will be described. FIG. 6 is a flowchart illustrating an example of the processing operation of the optical transmitter 10 related to the driving condition control process of the LD unit 13 of the first embodiment.

In FIG. 6, the DMT modulation unit 11 of the optical transmitter 10 allocates data to a plurality of SCs having different frequencies and multilevel-modulates the data allocated to each SC, thereby generating the DMT modulation signal in which the data has been allocated to the SCs (step S11). The amplifier unit 12 amplifies the DMT modulation signal.

The LD unit 13 is driven according to the amplified DMT modulation signal, optically converts the DMT modulation signal into the optical DMT modulation signal, and transmits the optical DMT modulation signal subjected to the optical conversion to the optical receiver 20 via the optical transmission path 2 (step S12). In such a case, the amount of the bias current of the LD unit 13 is set to a predetermined initial value by the bias control unit 18.

On the other hand, the SNR measurement unit 24 of the optical receiver 20 measures the SNR of the optical DMT modulation signal received from the optical transmitter 10.

The bit allocation unit 25 determines the number of bits, which can be allocated to each SC of the DMT modulation signal generated by the DMT modulation unit 11 of the optical transmitter 10, according to the measured SNR of the optical DMT modulation signal. The LD unit 28 transmits the optical DMT modulation signal, in which the BA information indicating the number of bits that can be allocated to each SC has been multiplexed, to the optical transmitter 10 via the optical transmission path 3.

The bias control unit 18 of the optical transmitter 10 acquires the BA information extracted from the DMT modulation signal obtained by electrically converting the optical DMT modulation signal received from the optical receiver 20 (step S13).

The bias control unit 18 monitors the maximum SC number on the basis of the number of bits that can be allocated to each SC and is indicated by the BA information, and determines whether the maximum SC number $N_{max}$ has reached the target value $N_{tar}$ (step S14).

When the maximum SC number $N_{max}$ has not reached the target value $N_{tar}$ (No at step S14), the bias control unit 18 adjusts the amount of the bias current of the LD unit 13 in a direction in which the maximum SC number $N_{max}$ approaches the target value $N_{tar}$ (step S15). In this way, the total number of SCs, to which the number of bits is allocated, increases, resulting in the improvement of the transmission characteristics, such as reception sensitivity and transmission capacity, of the optical DMT modulation signal output from the LD unit 13. Thereafter, the bias control unit 18 returns the process to step S13.

On the other hand, when the maximum SC number $N_{max}$ has reached the target value $N_{tar}$ (Yes at step S14), the bias control unit 18 returns the process to step S13 without adjusting the amount of the bias current of the LD unit 13.

As described above, the optical transmitter 10 of the first embodiment monitors the maximum SC number on the basis of the number of bits that can be allocated to each SC and is indicated by the BA information, and adjusts the amount of the bias current of the LD unit 13 in the direction in which the maximum SC number approaches the target value when the maximum SC number does not reach the target value. In this way, it is possible to optimize the driving condition of the LD unit 13 with a simple configuration in which no signal path for feeding back the SNR is provided between the optical transmitter 10 and the optical receiver 20. Furthermore, the bias current of the LD unit 13 is controlled using the BA information, an information amount of which is smaller than that of the SNR, so that it is possible to quickly adjust the amount of the bias current to an optimum value.

[b] Second Embodiment

The optical transmitter 10 of the aforementioned first embodiment monitors the maximum SC number on the basis of the number of bits that can be allocated to each SC and is indicated by the BA information, and adjusts the amount of the bias current of the LD unit 13 in the direction in which the maximum SC number approaches the target value when the maximum SC number does not reach the target value. However, the optical transmitter 10A of the second embodiment adjusts the amplitude of the bias current of the LD unit 13 in the direction in which the maximum SC number approaches the target value.

Figure 7:
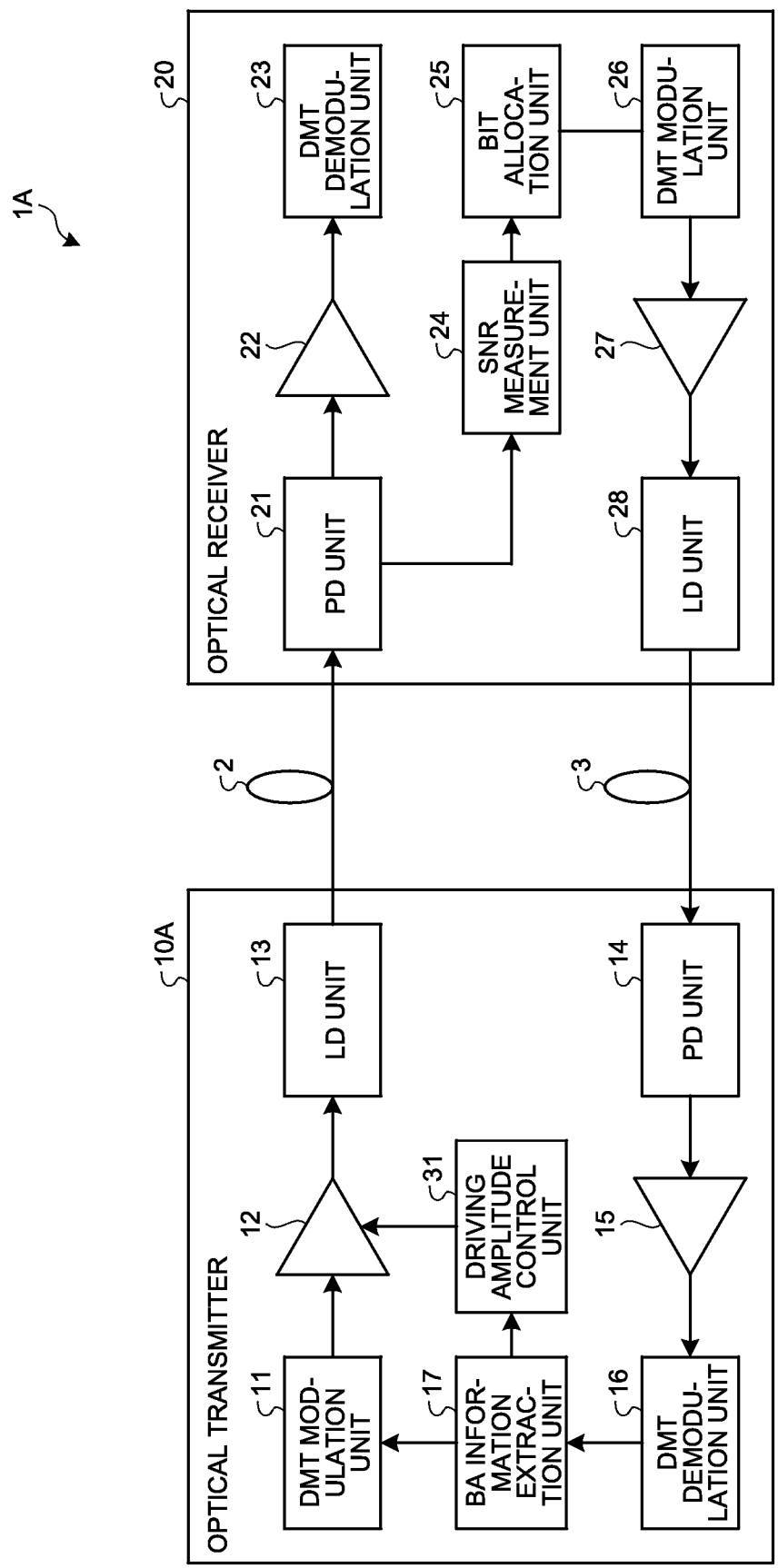
FIG. 7 is a diagram illustrating a configuration example of an optical transmission system of a second embodiment.

FIG. 7 is a diagram illustrating a configuration example of an optical transmission system 1A of the second embodiment. In FIG. 7, the same components as those of the optical transmission system 1 of the first embodiment are denoted by the same reference numerals, and description of redundant configurations and operations will be omitted. The optical transmission system 1A illustrated in FIG. 7 includes an optical transmitter 10A and the optical receiver 20. The optical transmitter 10A includes a driving amplitude control unit 31 instead of the bias control unit 18 illustrated in FIG. 1.

The driving amplitude control unit 31 controls the amplifier unit 12 by using the BA information extracted from the DMT modulation signal by the BA information extraction unit 17, thereby adjusting the amplitude (hereinafter, referred to as "driving amplitude") of the bias current which is a driving current supplied to the LD unit 13. The driving amplitude is an example of the driving condition of the LD unit 13. That is, the driving amplitude control unit 31 acquires the BA information extracted from the DMT modulation signal by the BA information extraction unit 17, and monitors the maximum SC number on the basis of the number of bits that can be allocated to each SC and is indicated by the BA information. Then, the driving amplitude control unit 31 adjusts the driving amplitude of the LD unit 13 by adjusting a gain amount of the amplifier unit 12 so that the maximum SC number approaches the target value. For example, when the maximum SC number is smaller than the target value, the driving amplitude control unit 31 increases the driving amplitude of the LD unit 13 by increasing the gain amount of the amplifier unit 12. As the driving amplitude of the LD unit 13 increases, the optical output power of the optical DMT modulation signal output from the LD unit 13 also increases. As a consequence, the SNR measured by the SNR measurement unit 24 of the optical receiver 20 is improved, so that the maximum SC number in the BA information generated by the bit allocation unit 25 of the optical receiver 20 approaches the target value.

Figure 8:
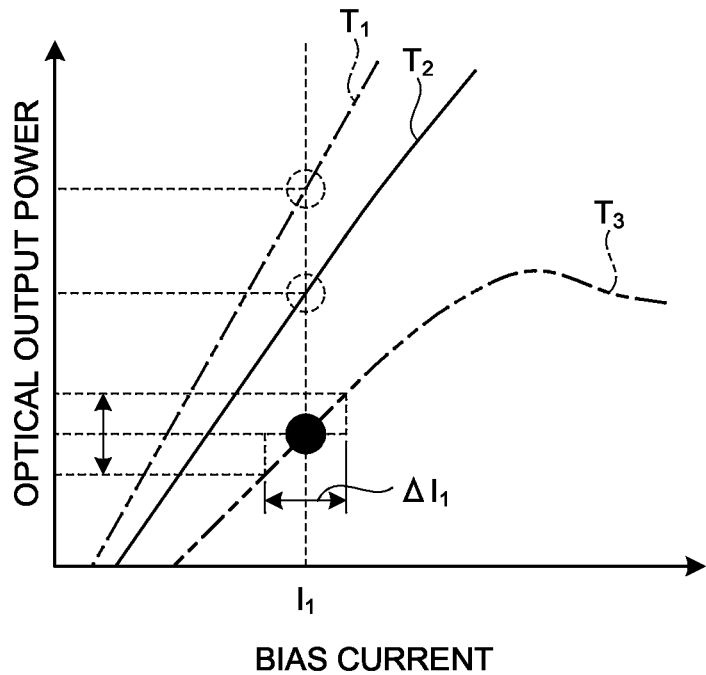
FIG. 8 is a diagram for explaining an example of a flow of adjusting a driving amplitude of the LD unit in the second embodiment.
Figure 9:
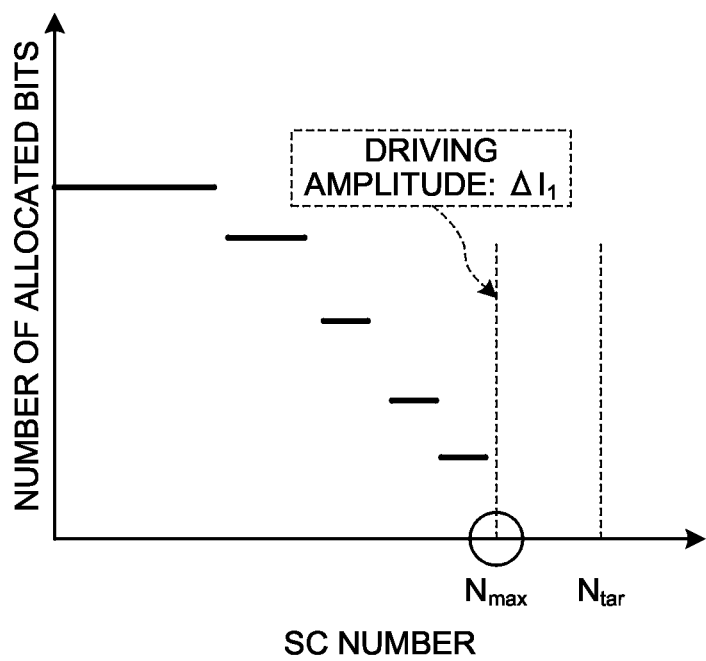
FIG. 9 is a diagram for explaining an example of a flow of adjusting the driving amplitude of the LD unit in the second embodiment.
Figure 10:
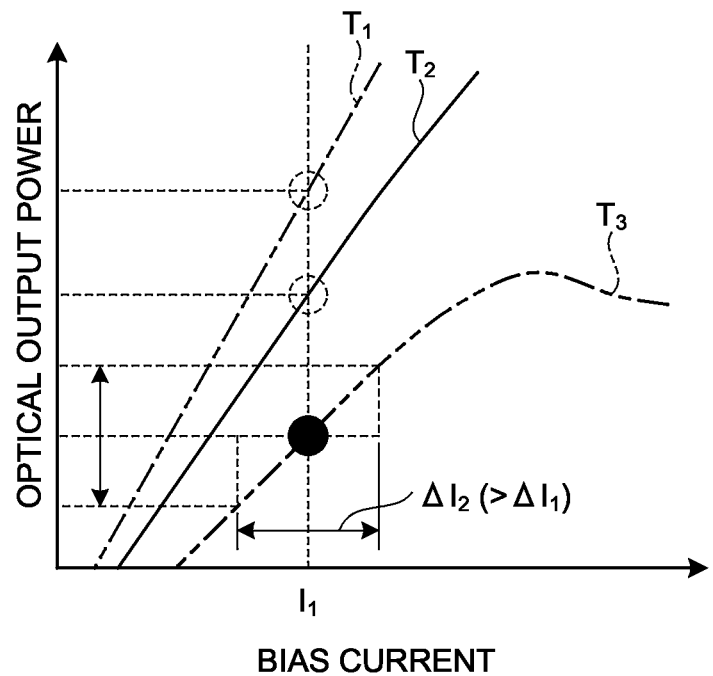
FIG. 10 is a diagram for explaining an example of a flow of adjusting the driving amplitude of the LD unit in the second embodiment.
Figure 11:
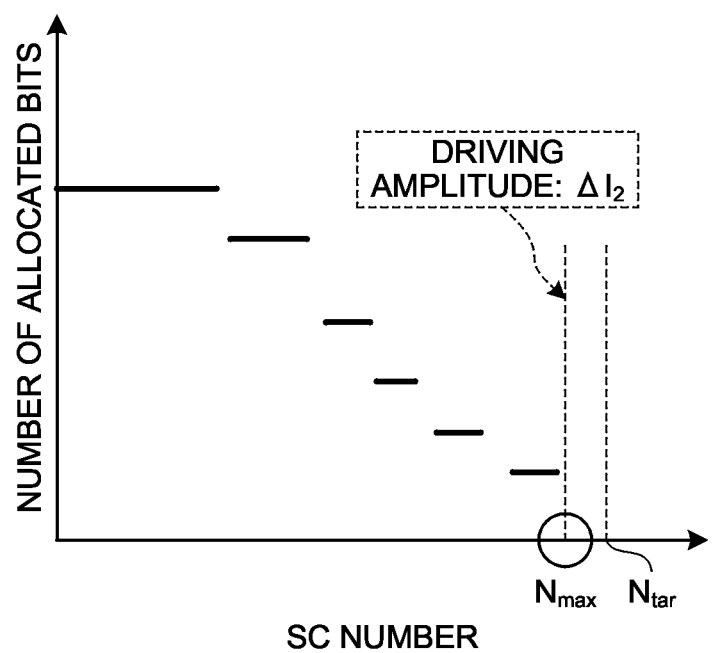
FIG. 11 is a diagram for explaining an example of a flow of adjusting the driving amplitude of the LD unit in the second embodiment.

FIG. 8 to FIG. 11 are diagrams for explaining an example of a flow of adjusting the driving amplitude of the LD unit 13 in the second embodiment. In FIG. 8, graphs $T_1$ to $T_3$ indicate characteristics of the bias current versus the optical output power when the environmental temperature is $T_1$ to $T_3$ ($T_1<T_2<T_3$), respectively. Furthermore, FIG. 8 illustrates a state in which the bias current of the LD unit 13 is set to $I_1$ and the driving amplitude of the LD unit 13 is set to $\Delta I_1$. When the bias current is maintained at $I_1$ and the driving amplitude of the LD unit 13 is maintained at $\Delta I_1$, the optical output power of the optical DMT modulation signal from the LD unit 13 decreases as the environmental temperature increases as $T_1 \rightarrow T_2 \rightarrow T_3$. The optical output power of the optical DMT modulation signal from the LD unit 13 decreases, resulting in a variation of the number of bits that can be allocated to each SC and is indicated by the BA information. FIG. 9 illustrates the BA information in which the number of bits that can be allocated to each SC varies. In the example of FIG. 9, as the optical output power of the optical DMT modulation signal from the LD unit 13 decreases, the maximum SC number $N_{max}$ is smaller than the target value $N_{tar}$. The driving amplitude control unit 31 of the optical transmitter 10A monitors the BA information illustrated in FIG. 9, determines that the maximum SC number $N_{max}$ is smaller than the target value $N_{tar}$, and increases the driving amplitude of the LD unit 13. When the maximum SC number $N_{max}$ is smaller than the target value $N_{tar}$, it can be estimated that the SNR of the optical DMT modulation signal output from the LD unit 13 is degraded. FIG. 10 illustrates a state in which the driving amplitude of the LD unit 13 is increased from $\Delta I_1$ to $\Delta I_2$ ($>I_1$). As the driving amplitude of the LD unit 13 is increased from $\Delta I_1$ to $\Delta I_2$, the optical output power of the optical DMT modulation signal from the LD unit 13 also increases. When the optical output power of the optical DMT modulation signal from the LD unit 13 increases, the SNR of the optical DMT modulation signal is improved, resulting in a variation of the number of bits that can be allocated to each SC and is indicated by the BA information. FIG. 11 illustrates the BA information in which the number of bits that can be allocated to each SC varies. In the example of FIG. 11, as the amplitude of the optical output power of the optical DMT modulation signal from the LD unit 13 increases, the maximum SC number $N_{max}$ approaches the target value $N_{tar}$. In this way, the total number of SCs, to which the number of bits is allocated, increases, resulting in the improvement of the transmission characteristics, such as reception sensitivity and transmission capacity, of the optical DMT modulation signal output from the LD unit 13.

Figure 12:
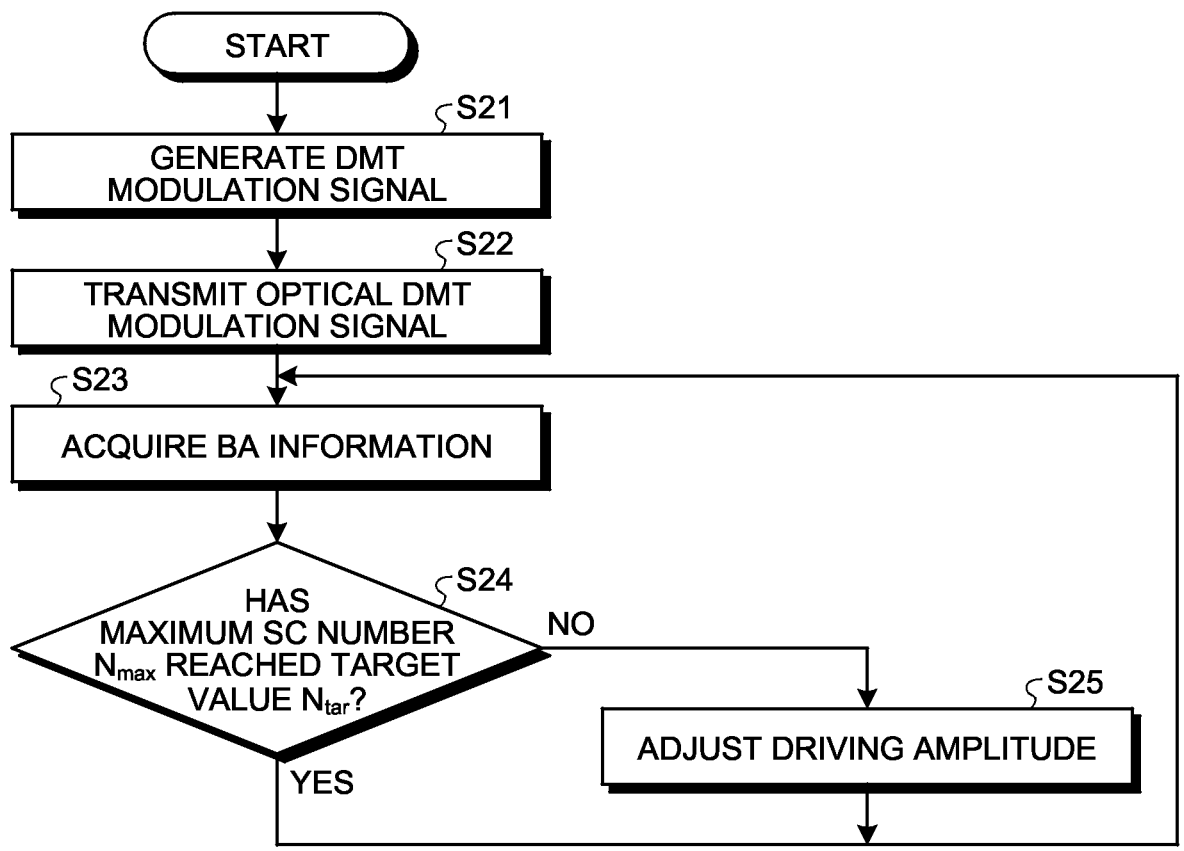
FIG. 12 is a flowchart illustrating an example of a processing operation of an optical transmitter related to a driving condition control process of the LD unit of the second embodiment.

Next, a processing operation of the optical transmitter 10A of the second embodiment will be described. FIG. 12 is a flowchart illustrating an example of the processing operation of the optical transmitter 10A related to the driving condition control process of the LD unit 13 of the second embodiment.

In FIG. 12, the DMT modulation unit 11 of the optical transmitter 10A allocates data to a plurality of SCs having different frequencies and multilevel-modulates the data allocated to each SC, thereby generating the DMT modulation signal in which the data has been allocated to the SCs (step S21). The amplifier unit 12 amplifies the DMT modulation signal.

The LD unit 13 is driven according to the amplified DMT modulation signal, optically converts the DMT modulation signal into the optical DMT modulation signal, and transmits the optical DMT modulation signal subjected to the optical conversion to the optical receiver 20 via the optical transmission path 2 (step S22). In such a case, the driving amplitude of the LD unit 13 is set to a predetermined initial value by the driving amplitude control unit 31.

On the other hand, the SNR measurement unit 24 of the optical receiver 20 measures the SNR of the optical DMT modulation signal received from the optical transmitter 10A. The bit allocation unit 25 determines the number of bits, which can be allocated to each SC of the DMT modulation signal generated by the DMT modulation unit 11 of the optical transmitter 10A, according to the measured SNR of the optical DMT modulation signal. The LD unit 28 transmits the optical DMT modulation signal, in which the BA information indicating the number of bits that can be allocated to each SC has been multiplexed, to the optical transmitter 10A via the optical transmission path 3.

The driving amplitude control unit 31 of the optical transmitter 10A acquires the BA information extracted from the DMT modulation signal obtained by electrically converting the optical DMT modulation signal received from the optical receiver 20 (step S23).

The driving amplitude control unit 31 monitors the maximum SC number on the basis of the number of bits that can be allocated to each SC and is indicated by the BA information, and determines whether the maximum SC number $N_{max}$ has reached the target value $N_{tar}$ (step S24).

When the maximum SC number $N_{max}$ has not reached the target value $N_{tar}$ (No at step S24), the driving amplitude control unit 31 adjusts the driving amplitude of the LD unit 13 by adjusting the gain amount of the amplifier unit 12 in the direction in which the maximum SC number $N_{max}$ approaches the target value $N_{tar}$ (step S25). In this way, the total number of SCs, to which the number of bits is allocated, increases, resulting in the improvement of the transmission characteristics, such as reception sensitivity and transmission capacity, of the optical DMT modulation signal output from the LD unit 13. Thereafter, the driving amplitude control unit 31 returns the process to step S23.

On the other hand, when the maximum SC number $N_{max}$ has reached the target value $N_{tar}$ (Yes at step S24), the driving amplitude control unit 31 returns the process to step S23 without adjusting the driving amplitude of the LD unit 13.

As described above, the optical transmitter 10A of the second embodiment monitors the maximum SC number on the basis of the number of bits that can be allocated to each SC and is indicated by the BA information, and adjusts the driving amplitude of the LD unit 13 in the direction in which the maximum SC number approaches the target value when the maximum SC number does not reach the target value. In this way, it is possible to optimize the driving condition of the LD unit 13 with a simple configuration in which no signal path for feeding back the SNR is provided between the optical transmitter 10A and the optical receiver 20. Furthermore, the driving amplitude of the LD unit 13 is controlled using the BA information, an information amount of which is smaller than that of the SNR, so that it is possible to quickly adjust the driving amplitude to an optimum value.

[c] Third Embodiment

The optical transmitter 10 of the aforementioned first embodiment adjusts the amount of the bias current of the LD unit 13 on the basis of the number of bits that can be allocated to each SC and is indicated by the BA information. However, the optical transmitter 10B of the second embodiment adjusts the amount of the bias current of the LD unit 13 and the driving amplitude of the LD unit 13.

Figure 13:
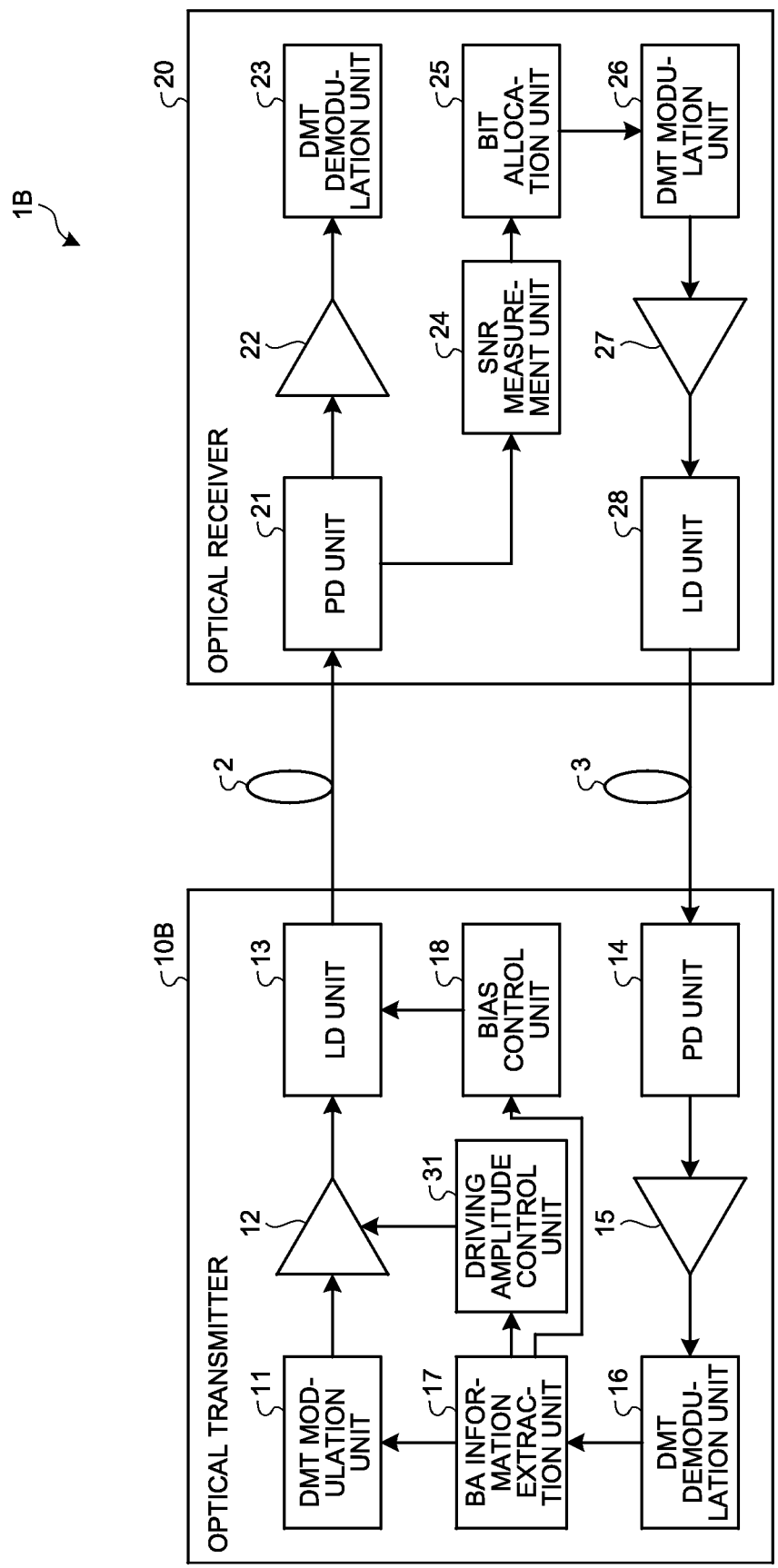
FIG. 13 is a diagram illustrating a configuration example of an optical transmission system of a third embodiment.

FIG. 13 is a diagram illustrating a configuration example of an optical transmission system 1B of the third embodiment. In FIG. 13, the same components as those of the optical transmission system 1 of the first embodiment are denoted by the same reference numerals, and description of redundant configurations and operations will be omitted. The optical transmission system 1B illustrated in FIG. 13 includes an optical transmitter 10B and the optical receiver 20. The optical transmitter 10B includes the driving amplitude control unit 31 illustrated in FIG. 7, in addition to the DMT modulation unit 11, the amplifier unit 12, the LD unit 13, the PD unit 14, the amplifier unit 15, the DMT demodulation unit 16, the BA information extraction unit 17, and the bias control unit 18 illustrated in FIG. 1.

The bias control unit 18 adjusts the amount of the bias current of the LD unit 13 by using the BA information extracted from the DMT modulation signal by the BA information extraction unit 17. The driving amplitude control unit 31 controls the amplifier unit 12 by using the BA information extracted from the DMT modulation signal by the BA information extraction unit 17, thereby adjusting the driving amplitude of the LD unit 13. Any one of the adjustment process of the amount of the bias current by the bias control unit 18 and the adjustment process of the driving amplitude by the driving amplitude control unit 31 may be performed first or both of them may be performed in parallel.

Figure 14:
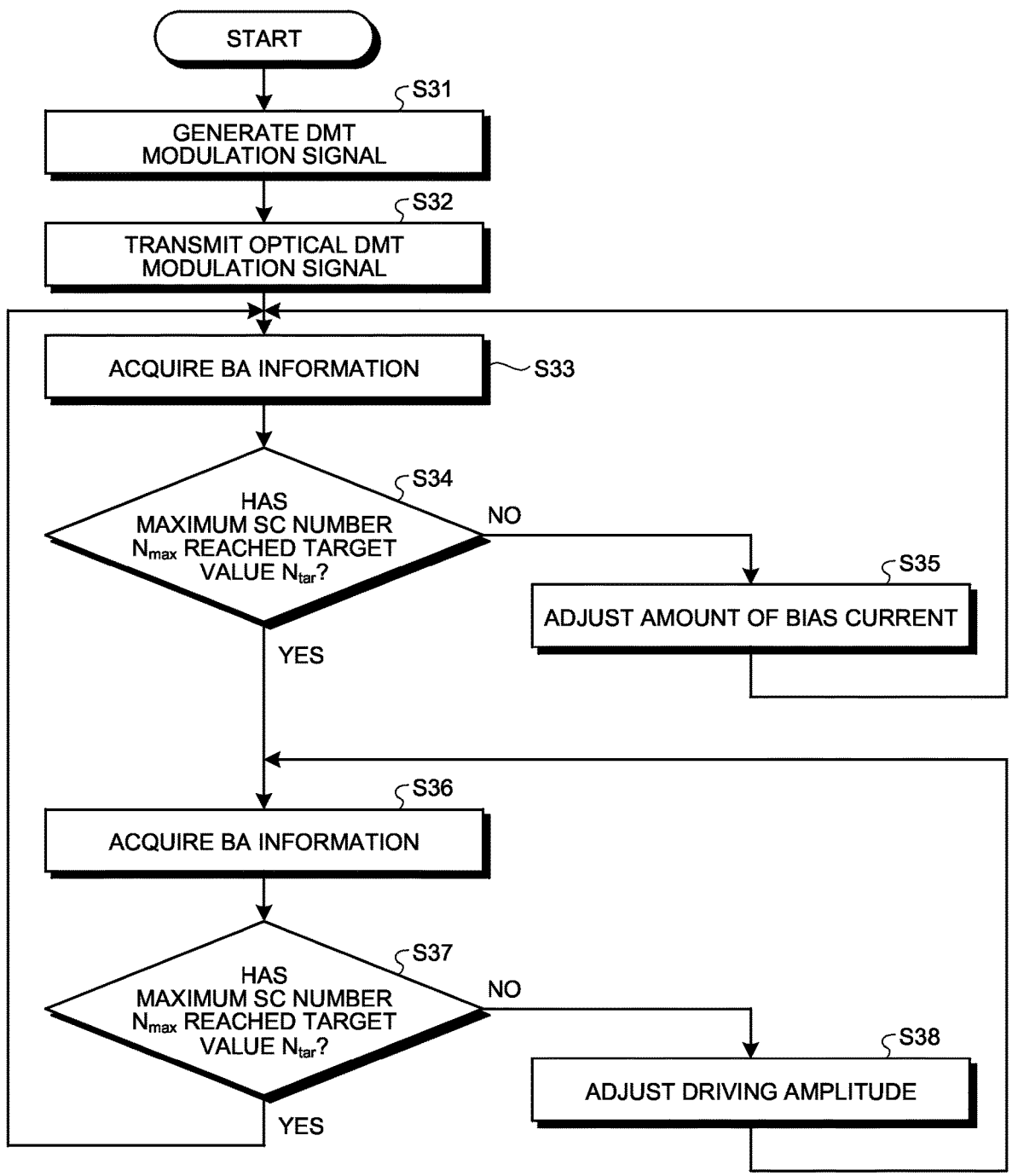
FIG. 14 is a flowchart illustrating an example of a processing operation of an optical transmitter related to a driving condition control process of the LD unit of the third embodiment.

Next, a processing operation of the optical transmitter 10B of the third embodiment will be described. FIG. 14 is a flowchart illustrating an example of the processing operation of the optical transmitter 10B related to the driving condition control process of the LD unit 13 of the third embodiment.

In FIG. 14, the DMT modulation unit 11 of the optical transmitter 10B allocates data to a plurality of SCs having different frequencies and multilevel-modulates the data allocated to each SC, thereby generating the DMT modulation signal in which the data has been allocated to the SCs (step S31). The amplifier unit 12 amplifies the DMT modulation signal.

The LD unit 13 is driven according to the amplified DMT modulation signal, optically converts the DMT modulation signal into the optical DMT modulation signal, and transmits the optical DMT modulation signal subjected to the optical conversion to the optical receiver 20 via the optical transmission path 2 (step S32). In such a case, the amount of the bias current of the LD unit 13 is set to a predetermined initial value by the bias control unit 18, and the driving amplitude of the LD unit 13 is set to a predetermined initial value by the driving amplitude control unit 31.

On the other hand, the SNR measurement unit 24 of the optical receiver 20 measures the SNR of the optical DMT modulation signal received from the optical transmitter 10B. The bit allocation unit 25 determines the number of bits, which can be allocated to each SC of the DMT modulation signal generated by the DMT modulation unit 11 of the optical transmitter 10B, according to the measured SNR of the optical DMT modulation signal. The LD unit 28 transmits the optical DMT modulation signal, in which the BA information indicating the number of bits that can be allocated to each SC has been multiplexed, to the optical transmitter 10B via the optical transmission path 3.

The bias control unit 18 of the optical transmitter 10B acquires the BA information extracted from the DMT modulation signal obtained by electrically converting the optical DMT modulation signal received from the optical receiver 20 (step S33).

The bias control unit 18 monitors the maximum SC number on the basis of the number of bits that can be allocated to each SC and is indicated by the BA information, and determines whether the maximum SC number $N_{max}$ has reached the target value $N_{tar}$ (step S34).

When the maximum SC number $N_{max}$ has not reached the target value $N_{tar}$ (No at step S34), the bias control unit 18 adjusts the amount of the bias current of the LD unit 13 in the direction in which the maximum SC number $N_{max}$ approaches the target value $N_{tar}$ (step S35). In this way, the total number of SCs, to which the number of bits is allocated, increases, resulting in the improvement of the transmission characteristics, such as reception sensitivity and transmission capacity, of the optical DMT modulation signal output from the LD unit 13. Thereafter, the bias control unit 18 returns the process to step S33.

On the other hand, when the maximum SC number $N_{max}$ has reached the target value $N_{tar}$ (Yes at step S34), the bias control unit 18 proceeds the process to step S36 without adjusting the amount of the bias current of the LD unit 13.

The driving amplitude control unit 31 acquires the BA information extracted from the DMT modulation signal obtained by electrically converting the optical DMT modulation signal received from the optical receiver 20 (step S36).

The driving amplitude control unit 31 monitors the maximum SC number on the basis of the number of bits that can be allocated to each SC and is indicated by the BA information, and determines whether the maximum SC number $N_{max}$ has reached the target value $N_{tar}$ (step S37).

When the maximum SC number $N_{max}$ has not reached the target value $N_{tar}$ (No at step S37), the driving amplitude control unit 31 adjusts the driving amplitude of the LD unit 13 by adjusting the gain amount of the amplifier unit 12 in the direction in which the maximum SC number $N_{max}$ approaches the target value $N_{tar}$ (step S38). In this way, the total number of SCs, to which the number of bits is allocated, increases, resulting in the improvement of the transmission characteristics, such as reception sensitivity and transmission capacity, of the optical DMT modulation signal output from the LD unit 13. Thereafter, the driving amplitude control unit 31 returns the process to step S36.

On the other hand, when the maximum SC number $N_{max}$ has reached the target value $N_{tar}$ (Yes at step S37), the driving amplitude control unit 31 returns the process to step S33 without adjusting the driving amplitude of the LD unit 13.

Figure 15:
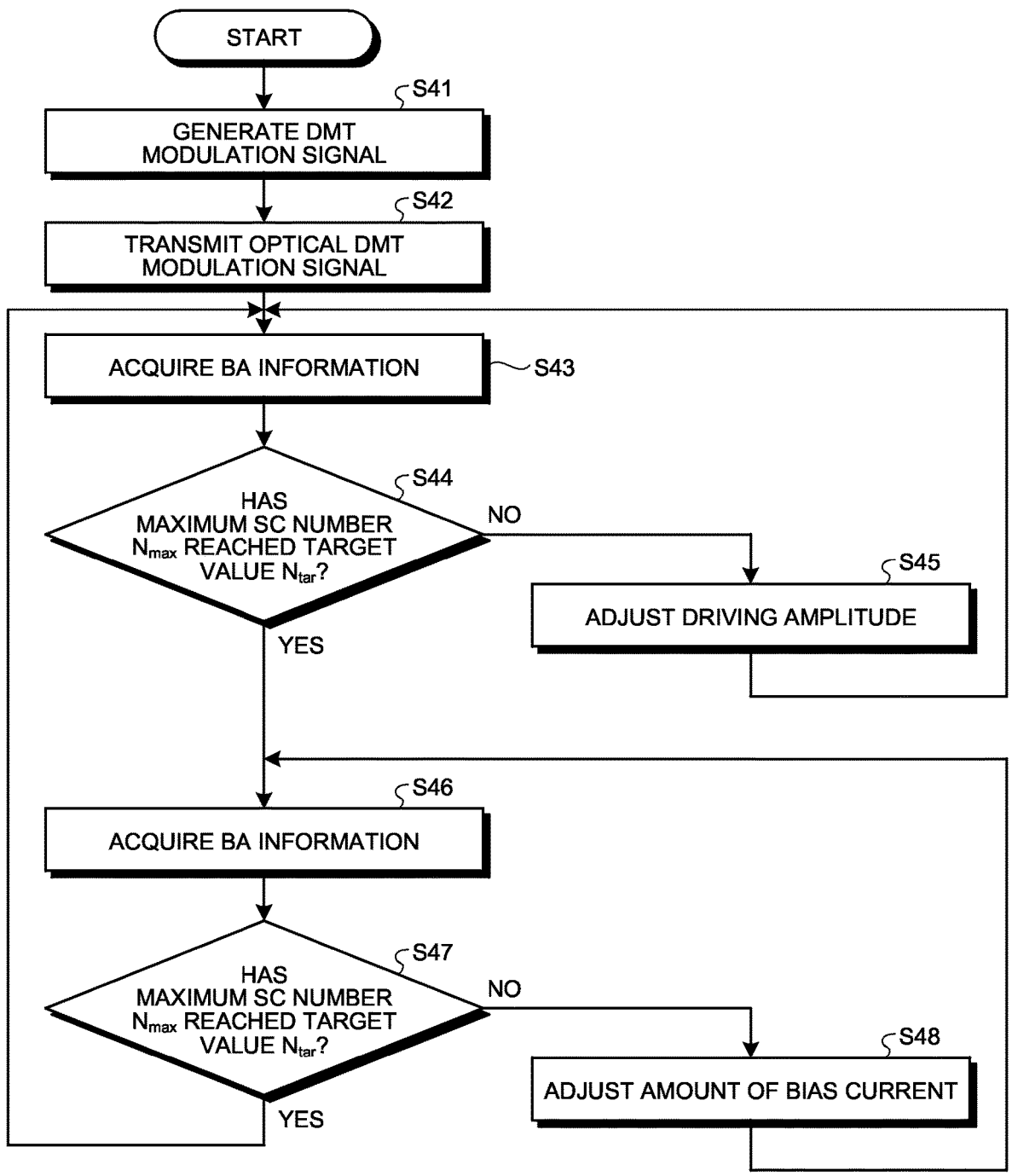
FIG. 15 is a flowchart illustrating an example of a processing operation of an optical transmitter related to a driving condition control process of the LD unit of the third embodiment.

In the example of FIG. 14, after the adjustment process of the amount of the bias current by the bias control unit 18 is performed, the adjustment process of the driving amplitude by the driving amplitude control unit 31 is performed; however, the adjustment process of the driving amplitude by the driving amplitude control unit 31 may be first performed. FIG. 15 is a flowchart illustrating another example of the processing operation of the optical transmitter 10B related to the driving condition control process of the LD unit 13 of the third embodiment.

In FIG. 15, the DMT modulation unit 11 of the optical transmitter 10B allocates data to a plurality of SCs having different frequencies and multilevel-modulates the data allocated to each SC, thereby generating the DMT modulation signal in which the data has been allocated to the SCs (step S41). The amplifier unit 12 amplifies the DMT modulation signal.

The LD unit 13 is driven according to the amplified DMT modulation signal, optically converts the DMT modulation signal into the optical DMT modulation signal, and transmits the optical DMT modulation signal subjected to the optical conversion to the optical receiver 20 via the optical transmission path 2 (step S42). In such a case, the amount of the bias current of the LD unit 13 is set to a predetermined initial value by the bias control unit 18, and the driving amplitude of the LD unit 13 is set to a predetermined initial value by the driving amplitude control unit 31.

On the other hand, the SNR measurement unit 24 of the optical receiver 20 measures the SNR of the optical DMT modulation signal received from the optical transmitter 10B. The bit allocation unit 25 determines the number of bits, which can be allocated to each SC of the DMT modulation signal generated by the DMT modulation unit 11 of the optical transmitter 10B, according to the measured SNR of the optical DMT modulation signal. The LD unit 28 transmits the optical DMT modulation signal, in which the BA information indicating the number of bits that can be allocated to each SC has been multiplexed, to the optical transmitter 10B via the optical transmission path 3.

The driving amplitude control unit 31 of the optical transmitter 10B acquires the BA information extracted from the DMT modulation signal obtained by electrically converting the optical DMT modulation signal received from the optical receiver 20 (step S43).

The driving amplitude control unit 31 monitors the maximum SC number on the basis of the number of bits that can be allocated to each SC and is indicated by the BA information, and determines whether the maximum SC number $N_{max}$ has reached the target value $N_{tar}$ (step S44).

When the maximum SC number $N_{max}$ has not reached the target value $N_{tar}$ (No at step S44), the driving amplitude control unit 31 adjusts the driving amplitude of the LD unit 13 by adjusting the gain amount of the amplifier unit 12 in the direction in which the maximum SC number $N_{max}$ approaches the target value $N_{tar}$ (step S45). In this way, the total number of SCs, to which the number of bits is allocated, increases, resulting in the improvement of the transmission characteristics, such as reception sensitivity and transmission capacity, of the optical DMT modulation signal output from the LD unit 13. Thereafter, the driving amplitude control unit 31 returns the process to step S43.

On the other hand, when the maximum SC number $N_{max}$ has reached the target value $N_{tar}$ (Yes at step S44), the driving amplitude control unit 31 proceeds the process to step S46 without adjusting the driving amplitude of the LD unit 13.

The bias control unit 18 acquires the BA information extracted from the DMT modulation signal obtained by electrically converting the optical DMT modulation signal received from the optical receiver 20 (step S46).

The bias control unit 18 monitors the maximum SC number on the basis of the number of bits that can be allocated to each SC and is indicated by the BA information, and determines whether the maximum SC number $N_{max}$ has reached the target value $N_{tar}$ (step S47).

When the maximum SC number $N_{max}$ has not reached the target value $N_{tar}$ (No at step S47), the bias control unit 18 adjusts the amount of the bias current of the LD unit 13 in the direction in which the maximum SC number $N_{max}$ approaches the target value $N_{tar}$ (step S48). In this way, the total number of SCs, to which the number of bits is allocated, increases, resulting in the improvement of the transmission characteristics, such as reception sensitivity and transmission capacity, of the optical DMT modulation signal output from the LD unit 13. Thereafter, the bias control unit 18 returns the process to step S46.

On the other hand, when the maximum SC number $N_{max}$ has reached the target value $N_{tar}$ (Yes at step S47), the bias control unit 18 returns the process to step S43 without adjusting the amount of the bias current of the LD unit 13.

As described above, the optical transmitter 10B of the third embodiment adjusts the amount of the bias current of the LD unit 13 and the driving amplitude of the LD unit 13 on the basis of the number of bits that can be allocated to each SC and is indicated by the BA information. In this way, it is possible to optimize the driving condition of the LD unit 13 with a simple configuration in which no signal path for feeding back the SNR is provided between the optical transmitter 10 and the optical receiver 20. Furthermore, as the amount of the bias current and the driving amplitude of the LD unit 13 are controlled using the BA information, an information amount of which is smaller than that of the SNR, so that it is possible to quickly adjust the amount of the bias current and the driving amplitude to optimum values.

In addition, each component of each unit illustrated in the aforementioned each embodiment does not always need to be physically configured as illustrated in the drawings. That is, the specific form of distribution and integration of each unit is not limited to the drawings and all or some thereof can be functionally or physically distributed and integrated in arbitrary units according to various loads, usage conditions or the like.

Moreover, all or some of the various processes performed by each device may be performed on a central processing unit (CPU) (or a microcomputer such as a micro processing unit (MPU) and a micro controller unit (MCU). Furthermore, all or some of the various processes may be performed on a computer program analyzed and executed by the CPU (or the microcomputer such as the MPU and the MCU) or wired logic-based hardware.

Figure 16:
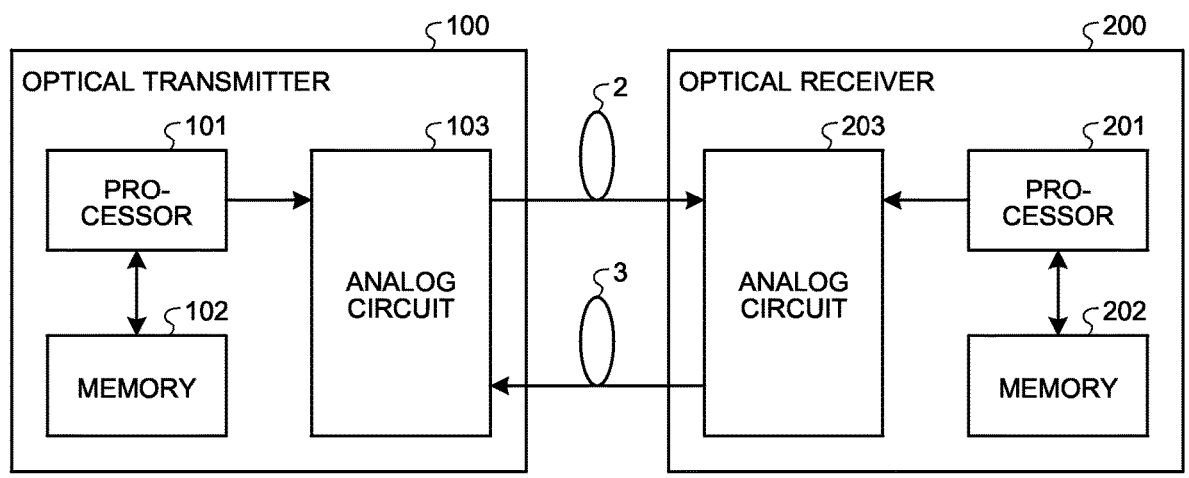
FIG. 16 is a diagram illustrating an example of a hardware configuration of the optical transmission system.

The optical transmission system according to the aforementioned each embodiment, for example, can be implemented by the following hardware configuration. FIG. 16 is a diagram illustrating an example of a hardware configuration of the optical transmission system.

As illustrated in FIG. 16, an optical transmitter 100 of the optical transmission system according to the aforementioned each embodiment includes a processor 101, a memory 102, and an analog circuit 103. An example of the processor 101 includes a CPU, a digital signal processor (DSP), a field programmable gate array (FPGA) or the like. Furthermore, an example of the memory 102 includes a random access memory (RAM) such as a synchronous dynamic random access memory (SDRAM), a read only memory (ROM), a flash memory or the like.

Furthermore, various processes performed by the optical transmitter 100 may be performed by a processor that executes computer programs stored in various memories such as nonvolatile storage media. That is, computer programs corresponding to the processes performed by the DMT modulation unit 11, the DMT demodulation unit 16, the BA information extraction unit 17, the bias control unit 18, and the driving amplitude control unit 31 may also be stored in the memory 102 and executed by the processor 101. Furthermore, the amplifier unit 12, the LD unit 13, the PD unit 14, and the amplifier unit 15 are implemented by the analog circuit 103.

As illustrated in FIG. 16, an optical receiver 200 of the optical transmission system according to the aforementioned each embodiment includes a processor 201, a memory 202, and an analog circuit 203. An example of the processor 201 includes a CPU, a DSP, a FPGA or the like. Furthermore, an example of the memory 202 includes a RAM such as a SDRAM, a ROM, a flash memory or the like.

Furthermore, various processes performed by the optical receiver 200 may be performed by a processor that executes computer programs stored in various memories such as nonvolatile storage media. That is, computer programs corresponding to the processes performed by the DMT demodulation unit 23, the bit allocation unit 25, and the DMT modulation unit 26 may also be stored in the memory 202 and executed by the processor 201. Furthermore, the PD unit 21, the amplifier unit 22, the SNR measurement unit 24, the amplifier unit 27, and the LD unit 28 are implemented by the analog circuit 203.

In the above, various processes performed by the optical transmission systems according to the embodiments are performed by one processor; however, the present disclosure is not limited thereto and various processes may also be performed by a plurality of processors.

According to an aspect of an optical transmission device disclosed in the present application, it is possible to obtain an effect of optimizing the driving condition of a light source with a simple configuration.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
a light source that is driven according to a multicarrier modulation signal in which data is allocated to a plurality of subcarriers to transmit an optical multicarrier modulation signal to another optical transmission device; and
a processor configured to control a driving condition of the light source, based on number of bits allocatable to each of the subcarriers of the multicarrier modulation signal, the number of bits being determined according to transmission characteristics of the optical multicarrier modulation signal in the other optical transmission device and being smaller than the transmission characteristics of the optical multicarrier modulation signal in an information amount, wherein
the processor is further configured to monitor an identification number of a maximum subcarrier among the subcarriers, the maximum subcarrier varying depending on the transmission characteristics of the optical multicarrier modulation signal, and the number of bits allocatable to the maximum subcarrier being not 0, based on the number of bits allocatable to each of the subcarriers, and adjusts an amount or an amplitude of a bias current supplied to the light source when the identification number of the maximum subcarrier has not reached a target value.

2. The optical transmission device according to claim 1, wherein information indicating the number of bits allocatable to each of the subcarriers is multiplexed into an optical signal transmitted from the other optical transmission device to the optical transmission device, and
the processor is further configured to acquire the information extracted from an electrical signal obtained by electrically converting the optical signal, and control the driving condition of the light source, based on the number of bits indicated by the information.

3. An optical transmission system comprising a first optical transmission device and a second optical transmission device connected to each other via optical transmission paths,
the first optical transmission device comprising:
a light source that is driven according to a multicarrier modulation signal in which data is allocated to a plurality of subcarriers to transmit an optical multicarrier modulation signal to the second optical transmission device; and
a processor configured to control a driving condition of the light source, based on number of bits allocatable to each of the subcarriers of the multicarrier modulation signal, the number of bits being determined according to transmission characteristics of the optical multicarrier modulation signal in the second optical transmission device and being smaller than the transmission characteristics of the optical multicarrier modulation signal in an information amount, wherein
the processor is further configured to monitor an identification number of a maximum subcarrier among the subcarriers, the maximum subcarrier varying depending on the transmission characteristics of the optical multicarrier modulation signal, and the number of bits allocatable to the maximum subcarrier being not 0, based on the number of bits allocatable to each of the subcarriers, and adjusts an amount or an amplitude of a bias current supplied to the light source when the identification number of the maximum subcarrier has not reached a target value,
the second optical transmission device comprising:
a processor configured to:
measure transmission characteristics of the optical multicarrier modulation signal transmitted by the first optical transmission device;
determine the number of bits allocatable to each of the subcarriers of the multicarrier modulation signal, according to the transmission characteristics of the optical multicarrier modulation signal; and
transmit information indicating the number of bits allocatable to each of the subcarriers, to the first optical transmission device, the number of bits being determined at the determining.

4. An optical transmission method of an optical transmission device, the optical transmission method comprising:
allowing a light source to be driven according to a multicarrier modulation signal in which data is allocated to a plurality of subcarriers to transmit an optical multicarrier modulation signal to another optical transmission device; and
controlling a driving condition of the light source, based on number of bits allocatable to each of the subcarriers of the multicarrier modulation signal, the number of bits being determined according to transmission characteristics of the optical multicarrier modulation signal in the other optical transmission device and being smaller than the transmission characteristics of the optical multicarrier modulation signal in an information amount, wherein
the controlling includes monitoring an identification number of a maximum subcarrier among the subcarriers, the maximum subcarrier varying depending on the transmission characteristics of the optical multicarrier modulation signal, and the number of bits allocatable to the maximum subcarrier being not 0, based on the number of bits allocatable to each of the subcarriers, and adjusting an amount or an amplitude of a bias current supplied to the light source when the identification number of the maximum subcarrier has not reached a target value.

* * * * *